United States Patent
Greenberg et al.

(10) Patent No.: US 11,630,206 B2
(45) Date of Patent: Apr. 18, 2023

(54) SYSTEM AND METHOD FOR GENERATING REPEATABLE PPM WAVEFORMS

(71) Applicant: RAYTHEON COMPANY, Waltham, MA (US)

(72) Inventors: Adam Hodge Greenberg, Los Angeles, CA (US); Eran Marcus, Culver City, CA (US)

(73) Assignee: RAYTHEON COMPANY, Waltham, MA (US)

( * ) Notice: Subject to any disclaimer, the term of this patent is extended or adjusted under 35 U.S.C. 154(b) by 484 days.

(21) Appl. No.: 16/863,858

(22) Filed: Apr. 30, 2020

(65) Prior Publication Data
US 2021/0341607 A1    Nov. 4, 2021

(51) Int. Cl.
| | | |
|---|---|---|
| G01S 17/10 | (2020.01) | |
| G01S 7/48 | (2006.01) | |
| G01S 17/89 | (2020.01) | |
| G01S 7/481 | (2006.01) | |
| G01S 7/489 | (2006.01) | |

(52) U.S. Cl.
CPC ............. G01S 17/10 (2013.01); G01S 7/489 (2013.01); G01S 7/4811 (2013.01); G01S 7/4817 (2013.01); G01S 17/89 (2013.01)

(58) Field of Classification Search
None
See application file for complete search history.

(56) References Cited

U.S. PATENT DOCUMENTS

| | | | |
|---|---|---|---|
| 4,527,276 A | 7/1985 | Gutleber | |
| 6,232,913 B1 * | 5/2001 | Lehtinen | G01S 7/295 |
| | | | 342/134 |

(Continued)

FOREIGN PATENT DOCUMENTS

| | | |
|---|---|---|
| CN | 104730535 A | 6/2015 |
| CN | 104168066 B | 8/2016 |

(Continued)

OTHER PUBLICATIONS

Bansal, S., et al., "Nature-inspired metaheuristic algorithms to find near-OGR sequences for WDM channel allocation and their performance comparison," Opten Math. 2017; 15:520-547.

(Continued)

*Primary Examiner* — Mikhail Itskovich
(74) *Attorney, Agent, or Firm* — Lewis Roca Rothgerber Christie LLP (57) ABSTRACT

Lidar and method for generating repeatable PPM waveforms to determine a range to a target include: a processor for a) creating a modulation pool, based on a maximum nominal PRF and a specified final PPM code length of N; b) obtaining a seed code; c) eliminating bad modulation levels from the modulation pool to generate a good modulation pool, d) selecting a modulation level from the good modulation pool; e) concatenating the selected modulation level to the seed code to generate an i-element modulation sequence; f) repeating steps c to e N times to generate an N-element modulation sequence; g) selecting a PRF less than the maximum nominal PRF; and h) generating a repeatable PPM waveform by applying the N-element modulation sequence to the selected PRF.

17 Claims, 3 Drawing Sheets

(56) References Cited

U.S. PATENT DOCUMENTS

| | | |
|---|---|---|
| 9,858,304 B2 | 1/2018 | Marcus et al. |
| 2017/0329010 A1 | 11/2017 | Warke et al. |

FOREIGN PATENT DOCUMENTS

| | | |
|---|---|---|
| EP | 1 884 800 A1 | 2/2008 |
| EP | 2 694 996 A1 | 2/2014 |

OTHER PUBLICATIONS

Dimitromanolakis, A., "Analysis of the Golomb Ruler and the Sidon Set Problems, and Determination of Large, Near-Optimal Golomb Rulers," Department of Electronic and Computer Engineering Technical University of Crete, Jun. 2002, 118 pages.

Erdos, P., et al., "On a Problem of Sidon in Additive Number Theory, and on Some Related Problems," Journal of the London Mathematical Society, vol. 16, 1941, 4 pages.

Fluckiger, D.U. et al., "Optimal pseudorandom pulse position modulation ladar waveforms," Applied Optics, Mar. 20, 2015, vol. 54, No. 9, 4 pages.

Gagliardi, R., et al., "Acquisition Sequences in PPM Communications", IEEE Transactions on Information Theory, vol. IT-33, No. 5, Sep. 1987, 7 Pages.

Hiskett, P.A., et al., "A photon-counting time-of-flight ranging technique developed for the avoidance of range ambiguity at gigahertz clock rates," Optics Express. Sep. 1, 2008, vol. 16, No. 18, 14 pages.

Mao, X., et al., "Pulse position modulation for compact all-fiber vehicle laser rangefinder development," OpticalEngineering. SPIEDigitalLibrary.org, 56(10), Oct. 2017, 9 pages.

Milstein, A.B., et al., "Acquisition algorithm for direct-detection ladars with Geiger-mode avalanche photodiodes," Applied Optics, vol. 47, No. 2, Jan. 10, 2008, 16 pages.

Gunzung Kim, et al. "Suitable Combination of Direct Intensity Modulation and Spreading Sequence for LIDAR with Pulse Coding", Sensors, vol. 18, No. 12, Nov. 30, 2018 (pp. 1-22).

International Search Report for corresponding International Application No. PCT/US2020/066481, filed Dec. 21, 2020, International Search Report dated Mar. 23, 2021 and dated Apr. 1, 2021 (5 pgs.).

Written Opinion of the International Searching Authority for corresponding International Application No. PCT/US2020/066481, filed Dec. 21, 2020, Written Opinion of the International Searching Authority dated Apr. 1, 2021 (5 pgs.).

International Search Report for related International Application No. PCT/US2020/066666, filed Dec. 22, 2020, International Search Report dated Mar. 25, 2021 and dated Apr. 6, 2021 (4 pgs.).

Written Opinion of the International Searching Authority for related International Application No. PCT/US2020/066666, filed Dec. 22, 2020, Written Opinion of the International Searching Authority dated Apr. 6, 2021 (6 pgs.).

\* cited by examiner

SYSTEM AND METHOD FOR GENERATING REPEATABLE PPM WAVEFORMS

GOVERNMENT LICENSE RIGHTS

This invention was made with Government support. The Government has certain rights in the invention.

FIELD OF THE INVENTION

The disclosed invention relates generally to lidars; and more particularly to system and method for generating Pulse Position Modulated (PPM) lidar waveforms that are repeatable and are cyclically optimal.

BACKGROUND

Pulsed laser radar sensors, also known as lidars or ladars, are active sensing systems that determine the range to a target by measuring the time of flight of short laser pulses reflected off the target. A lidar system generally includes three primary subsystems: a laser transmitter, an optical receiver, and a processor. The transmitter is capable of generating laser pulses when commanded, and of directing these pulses in the direction of the target. A key characteristic of these pulses is that they are each 1-25 nanoseconds in duration, so that the resulting range measurement may be accurate to within a few meters.

The receiver includes an optical system capable of collecting light reflected from the target, and a photodetector that can record the arrival of reflected light. The photodetector is capable of timing the arrival of return pulses with an accuracy similar in scale to the laser pulse duration. The processor is configured to control the operation of the transmitter and receiver, and to extract information about the target from the detections made by the receiver. The processor is also capable of synchronizing the commands issued to the transmitter and the receiver. An essential aspect of the return processing is the ability to determine target characteristics accurately despite complex scattering of the transmitted light, imperfect detection of the returns, unwanted detections due to ambient light and electrical noise, and modulation of the return due to target motion, among other practical complications.

In common operational conditions, the target return from a single transmitted pulse is not sufficient for target detection, and multiple pulses must be used. As is well-known in the art, the pulse waveform, or sequence of times at which pulses are transmitted, needs to be selected carefully to allow unambiguous interpretation of the returns. If pulses are widely spaced, it may be straightforward to associate specific returns with their corresponding transmit pulses, but the integration (or dwell) time required to transmit and receive a sufficient number of pulses may be excessive. If pulses are repeated at higher frequency, the integration time decreases, but the time of flight calculation may become ambiguous.

Some problems of range ambiguity can be solved with the use of waveforms that apply some type of encoding to each pulse. One such encoding generates pulse position modulated (PPM) waveforms. PPM encodes waveforms by modulating the position of each outgoing pulse with respect to some nominal underlying position. This underlying position is determined by the pulse number divided by the waveform's nominal Pulse Repetition Frequency (PRF). PPM encoding works adequately in some cases, but current methods of constructing these waveforms are computationally intensive and limited in applicability.

The issue of range ambiguity may be eliminated by increasing the PRI long enough to cover the desired range. Using low PRFs would be ideal when trying to cover a long range. However, this is not always feasible during the design of a lidar system. To extend direct-detect lidar performance, the lidar needs the ability to transmit pulse trains with high average power. However, Fiber lasers used in lidars operate most efficiently at high PRFs. But, high PRFs exacerbate the problem of range ambiguity.

Some conventional techniques for determining time of flight from an extended pulsed waveform to compute the cross-correlation between the transmit waveform and a set of recorded photodetection times. However, these techniques are limited to post-collection processing, which limits the speed at which range estimates may be determined. Furthermore, this method does not account for waveform compression or stretching due to target motion.

Figure 1A:
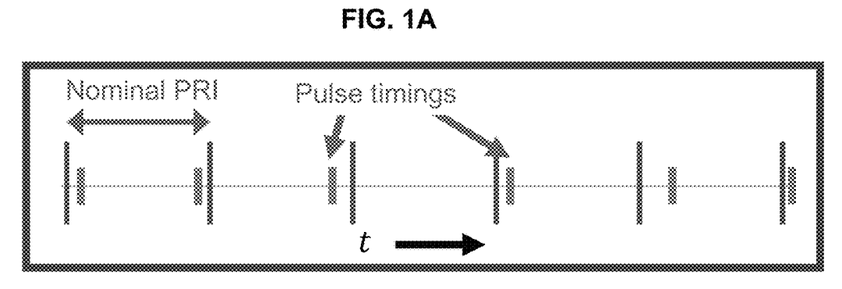
FIG. 1A shows a typical PPM waveform.
Figure 1B:
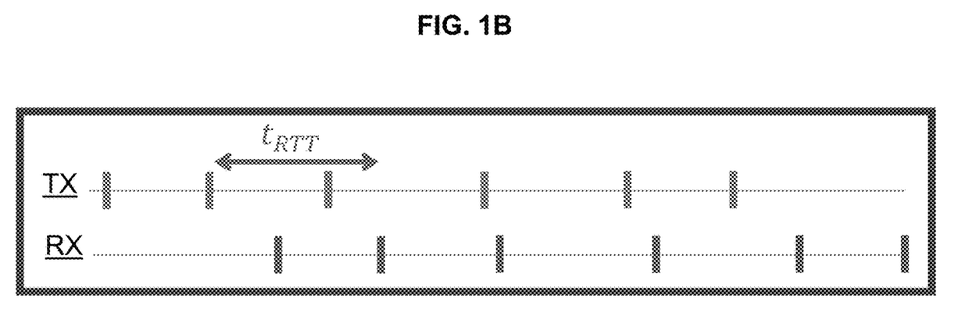
FIG. 1B depicts a typical range determination from the PPM waveform of FIG. 1A.

FIG. 1A shows a typical pseudorandom PPM (PRPPM) waveform. As shown, unambiguous ranging can be accomplished with pulse position modulated codes, where pulse timings are encoded by modulating them from a nominal repetition frequency. FIG. 1B depicts a typical range determination from the PPM waveform of FIG. 1A. As depicted, range can then be unambiguously determined by cross-correlating return timings with transmit timings. The lag associated with the peak of the cross-correlation yields the target round trip time, $t_{RTT}$.

A PPM waveform is considered optimal if the peak of the auto-correlation of the waveform is the only element of the auto-correlation whose value exceeds one. Optimal waveforms are required for determining range to certain kinds of targets. However, generating optimal waveforms is not straightforward. Pulses have a maximum possible modulation ($j_{max}$), and a finite modulation resolution ($\Delta j$). This limits the number of possible modulations per pulse to $n_d = 2j_{max}/\Delta j$. As waveforms get longer, it becomes harder to add new code elements, as the probability of appending an element that makes the waveform non-optimal increases.

In some conventional approaches, optimal codes are calculated by starting with a seed code, and iteratively expanding it, where at each iteration, a modulation value is selected from the modulation pool. The modulation value is then added as a new code element, and the auto-correlation of the resulting code is calculated. If the auto-correlation has any side-lobes greater than unity (rendering the code non-optimal), then the new code element is removed, the modulation value is removed from the pool, and the process is restarted. Otherwise, the new code element is kept, and the process is restarted.

Waveform quality can be measured by the shape of its auto-correlation. The peak-to-maximum-side-lobe ratio (PMSLR) serves as a measure of code quality. For example, an optimal waveform with N elements, has no side-lobes with height >1, or equivalently, has PMSLR=N. This enables unambiguous ranging from just two signal photoelectrons (in the absence of noise). Note that optimal waveforms have a defined length, or number of waveform elements. Once that length is reached, the waveform must end. If the waveform were, for instance, repeated, the resulting signal would no longer be optimal. However, the PMSLR of cyclically optimal waveforms is not a function of total code length. Therefore, for engagements requiring some fixed minimum PMSLR, the time required to generate a PMSLR is independent of the total dwell time for which the code is needed. This can be especially helpful for scenarios where total dwell time is not known a priori (such as staring mode ladar systems) and therefore a flexible code may be needed, or in situations where new codes must be generated quickly and frequently.

Several techniques exist for generating optimal PPM waveforms. But, all of these techniques would require a prohibitively large amount of computational resources in order to calculate very long codes. Nevertheless, certain observational conditions may require long codes. In particular, due to low signal-to-noise ratio (SNR), some applications of lidars require a very high pulse-to-photon-return ratio (PPRR). In these situations, target detection can only be achieved by transmitting many pulses. For example, with PPRR=$10^5$ and a detection criterion of 10 signal photons, a million-pulse PPM waveform would be needed to both detect and range a target.

SUMMARY

In some embodiments, the disclosed invention is a method for generating repeatable Pulse Position Modulated (PPM) lidar waveforms that are cyclically optimal. The method includes: a) creating a modulation pool, based on a maximum nominal pulse repetition frequency (PRF) and a specified final PPM code length of N, wherein N is an integer greater than 1; b) obtaining a seed code; c) eliminating bad modulation levels from the modulation pool to generate a good modulation pool; d) selecting a modulation level from the good modulation pool; e) concatenating the selected modulation level to the seed code to generate an i-element modulation sequence, wherein i is an integer index greater than 1; f) repeating steps c to e N times to generate an N-element modulation sequence; g) selecting a PRF less than the maximum nominal PRF; h) generating a repeatable base PPM waveform by applying the N-element PPM code to the selected PRF; and i) transmitting the base PPM waveform with the lidar toward a target to determine a range to the target.

In some embodiments, the disclosed invention is a lidar that generates repeatable Pulse Position Modulated (PPM) waveforms that are cyclically optimal in a lidar. The lidar includes a processor for a) creating a modulation pool, based on a maximum nominal pulse repetition frequency (PRF) and a specified final PPM code length of N, wherein N is an integer greater than 1; b) obtaining a seed code; c) eliminating bad modulation levels from the modulation pool to generate a good modulation pool; d) selecting a modulation level from the good modulation pool; e) concatenating the selected modulation level to the seed code to generate an i-element modulation sequence, wherein i is an integer index greater than 1; f) repeating steps c to e N times to generate an N-element modulation sequence; g) selecting a PRF less than the maximum nominal PRF; h) generating a repeatable base PPM waveform by applying the N-element PPM code to the selected PRF; and i) transmitting the base PPM waveform by the lidar toward a target to determine a range to the target.

Eliminating bad modulation levels includes: discarding modulation levels that cause a baud collision between any pair of code elements in the base PPM waveform; discarding modulation levels that cause a baud collision between any pair of code elements in the base PPM waveform and a concatenated code formed by concatenating the base PPM waveform to itself; and discarding modulation levels that lie equidistant between the elements in the base PPM waveform, and code elements in the concatenated code. The lidar further includes a transmitter for transmitting the PPM waveform toward the target; and a receiver for receiving a waveform reflected from the target to determine the range to the target.

In some embodiments, the modulation level is selected using a selection function, where the selection function computes a best available next PPM code element, and/or is optimized to generate longer PPM codes. In some embodiments, the selection function chooses a new modulation level from the good modulation pool such that the new modulation level maximizes the minimum distance between its own position and position of modulation levels that have been removed from the modulation pool.

BRIEF DESCRIPTION OF THE DRAWINGS

These and other features, aspects, and advantages of the disclosed invention will become better understood with regard to the following description, appended claims, and accompanying drawings.

DETAIL DESCRIPTION

In some embodiments, the disclosed invention generates cyclically optimal PPM codes, which can be repeated, head-to-tail, and maintain their PMSLR for any dwell time, as long as the target's round-trip time is less than the extent of the base code.

A cyclically optimal code P, of length N, is defined by the following properties: P is optimal; and any new code, P', generated by concatenating copies of P, will have the same PMSLR as P for auto-correlation lags that are less than $N \times T_{PRI}$, where $T_{PRI}$ is the pulse repetition interval. That is, a new (second) code generated by concatenating copies of a cyclically optimal base code of length N has the highest possible PMSLR that can be achieved by concatenating copies of any base code of length N. The utility of cyclically optimal codes is motivated by two competing constraints on PPM code length: 1) optimal codes have a maximum length that is determined by the size of the modulation pool, which in turn is hardware limited; and 2) link budgets may require codes of a minimum length, particularly when the expected SNR is low. Therefore, an optimal code of the length that is required by the link budget (a system requirement) may not always be available, due to a limited modulation pool size.

Figure 2:
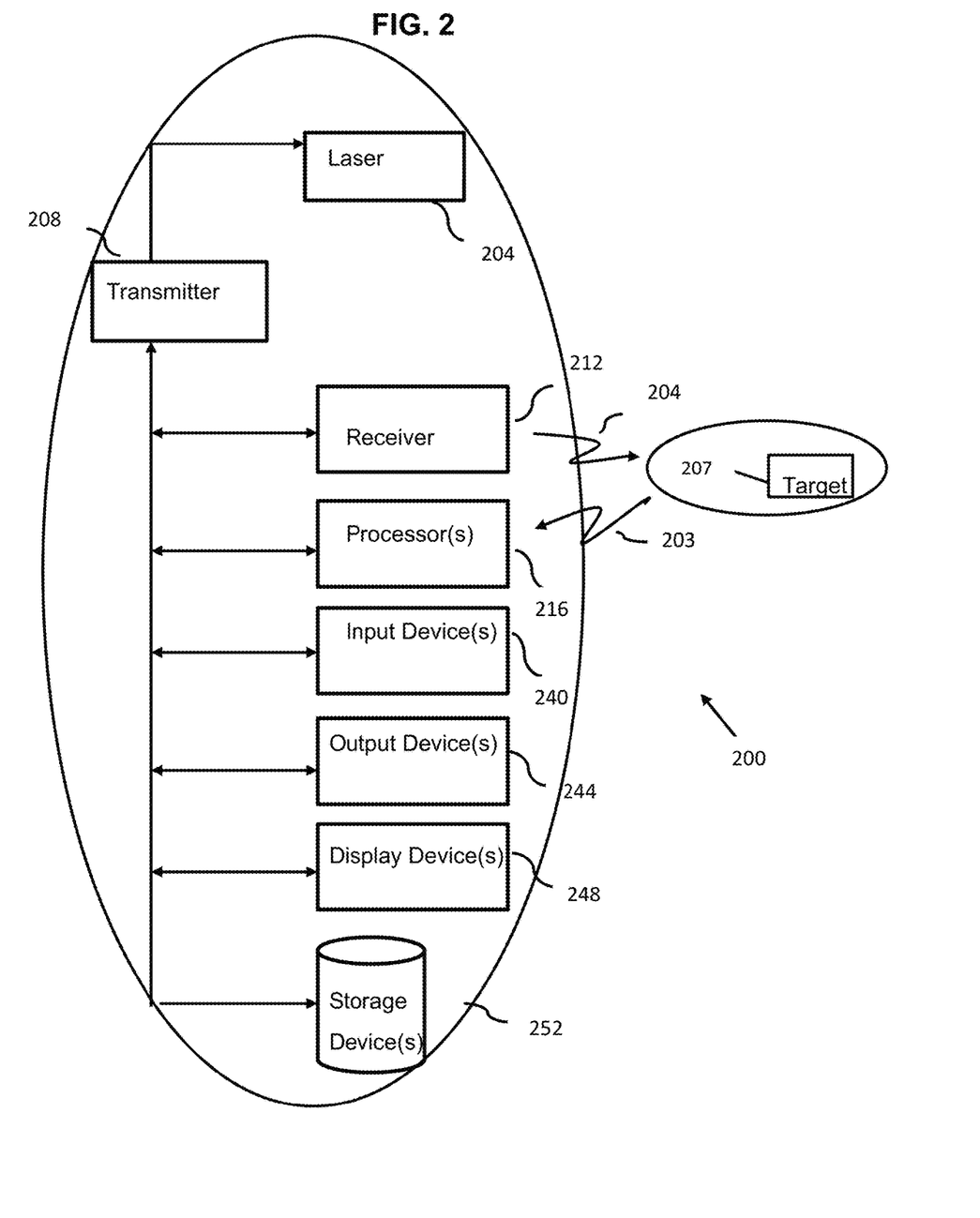
FIG. 2 is a system block diagram of an exemplary lidar system, according to some embodiments of the disclosed invention.

FIG. 2 is a system block diagram of an exemplary lidar system 200, according to some embodiments of the disclosed invention. As shown, a lidar platform includes a laser 204, a transmitter 208 and receiver 212. The transmitter 208 sends lidar transmission pulses 224 towards one or more targets 207 within a region of interest. lidar return pulses (samples) 203 are generated in response to the lidar transmission pulses reflecting off of a plurality of objects (targets) within the region of interest. In some embodiments, the echo from each target (as seen at the receiver) is a version of the transmitted signal that is 1) time delayed by the transit time from transmitter to target to receiver, 2) frequency shifted due to target motion, and 3) attenuated by some factor. The receiver observes a return signal consisting of each of the target echoes (plus random noise).

System 200 also includes one or more input devices 240, one or more output devices 244, one or more display devices 248, one or more processors 216, and one or more storage devices 252. The modules and devices described herein can, for example, utilize the one or more processors 216 to execute computer executable instructions and/or the modules and devices described herein and may include their own processor to execute computer executable instructions. As known in the art, the one or more processors 216 include their own memories, such as RAMs and ROMs to store and execute program instructions. One skilled in the art would understand that the system 200 can include, for example, other modules, devices, and/or processors known in the art and/or varieties of the described modules, devices, analog-to digital converters (ADCs), digital-to-analog converters (DACs), and/or processors.

The input devices 240 receive information from a user (not shown) and/or another computing system (not shown). The input devices 240 can include, for example, Bluetooth interface, WiFi interface, network interface, a keyboard, a scanner, a microphone, a stylus, a touch sensitive pad or display. The output devices 244 output information associated with the system 200 (e.g., information to remote devices, information to a speaker, information to a display, for example, graphical representations of information). The processors 216 execute instructions for the system (e.g., applications). The storage devices 252 store a variety of information/data, including lidar range data generated by the system 200 and prior measurements. The display devices 248 display information associated with the system 200, for example, target information including their position, distance, type and the like, status information, configuration information and the like. The storage devices 252 can include, for example, long-term storage, such as a hard drive, a tape storage device, or flash memory; short-term storage, such as a random-access memory, or a graphics memory; and/or any other type of computer readable storage. In some embodiments, the process according to the disclosed invention is performed by the processor(s) 216, utilizing some or all of the components illustrated in FIG. 2.

In some embodiments, the disclosed invention generates a waveform by constructing a cyclically optimal (base) code. Such codes have the property that they can be repeated, head-to-tail, and the peak-to-side-lobe-ratio (PMSLR), a measure of code quality will not change as a function of the number of code repetitions. In other words, this cyclically optimal base code can be concatenated to itself any number of times, including zero time, which means no concatenation, before or while it is being transmitted. A waveform generated by concatenating copies of a cyclically optimal code of length N has the highest possible PMSLR that can be achieved by concatenating copies of any code of length N. This waveform generation is accomplished by constructing a base code and defining an additional set of constraints, which are added during code construction, as described below. These constraints yield codes that are shorter by a factor of approximately sqrt(2), but can be repeated indefinitely with no degradation in PMSLR.

In some embodiments, the disclosed invention 1) filters out (discards) modulation values (levels) that would cause a collision between some pair of base code elements; 2) filters out modulation values that would cause a baud collision between any base code element and any code element in a concatenated code where the base code is concatenated to itself; and 3) filters out modulation values that would lie equidistant between some previous code element, and a later code element, as described by Equation (10) below. Avoiding the kinds of collisions in the second filtering condition above is referred to as avoiding collisions in a "wrap-around region."

As a result, the generated concatenated PPM codes can be repeated indefinitely and have the same PMSLR as the base code, independent of their total length. This approach always explicitly calculates which modulation values are available, and therefore avoids a slow-down in processing time. Optimality is maintained by the present approach as long as the maximum absolute modulation never exceeds one quarter of the nominal pulse repetition interval (PRI).

There are two considerations of optimal PPM codes to examine for mathematical proof of the above-described process. Both of these considerations rely on another way of looking at code optimality: a code is optimal if the differences between all pairs of pulses are distinct, and baud collisions occur in a code of length N if there exist two or more pairs of pulses with shared differences, i.e., if:

$$t_i - t_j = t_k - t_l, \text{ for } i,j,k,l < N \tag{1}$$

where $t_m$ is the transmit timing of the m-th pulse.

This equation (1) is the general baud collision condition.

Consideration #1

As long as the difference between pulses from adjacent PRIs in a code is always greater than the maximum possible spread in the modulation pool, then the only possible baud collisions that can occur are between pulse pairs that are the same number of PRIs apart. In other words, if we apply the constraint that $(T_{m+1} - j_{max}) - (T_m + j_{max}) > 2j_{max}$, where $T_m$ is the nominal (i.e., non-modulated) transmit timing of the m-th pulse, then the baud collision condition relaxes to following equation (2):

$$t_i - t_j = t_k - t_l, \text{ for } |i-j| = |k-l|$$

Consideration #2

Define the transmit timing of the m-th pulse, $t_m$, as a sum of a nominal pulse timing, $T_m$, and the corresponding code, $j_m$:

$$t_m := T_m + j_m \tag{3}$$

The nominal pulse timing $T_m$ is just the location of a pulse if a purely periodic pulse timing were used, i.e.:

$$T_m = mT_{PRI} \tag{4}$$

where $T_{PRI}$ is the pulse repetition interval.

This means that the baud collision condition, $t_i - t_j = t_k - t_l$, can be written as:

$$(iT_{PRI} + j_i) - (jT_{PRI} + j_j) = (kT_{PRI} + j_k) - (lT_{PRI} + j_l) \tag{5}$$

or equivalently $$T_{PRI}(i-j) + j_i - j_j = T_{PRI}(k-l) + j_k - j_l \tag{6}$$

If the constraint defined in consideration #1 is met, then it is also known that baud collisions can only occur if $|i-j| = |k-l|$. Inserting this into equation (6) gives a new baud collision condition:

$$j_i - j_j = j_k - j_l, \text{ for } |i-j| = |k-l| \tag{7}$$

where $j_m$ is the modulation value applied to the m-th code element.

Putting together these two considerations, if a constraint is enforced on the waveforms $$(T_{m+1} - j_{max}) - (T_m + j_{max}) > 2j_{max} \tag{8}$$

Then, the presence of baud collisions is independent of the PRI. Baud collisions is purely determined by which modulation values are applied at which code element position (note that this constraint is equivalent to the requirement that $$\frac{j_{max}}{PRI} < 0.25,$$

while most lidars have the more onerous hardware limitations of $$\frac{j_{max}}{PRI} \le 0.1).$$

This means that with a list of N modulation values that are optimal, one can directly determine which modulation values, when placed at the (N+1)-th code element position, would cause a baud collision. Specifically, one can explicitly compute all of the bad modulation values, $j_{bad}$, for the (N+1)-th code element, via:

$$j_{bad} = j_{N+1-(i-k)} + j_i - j_k \text{ for } i < k < N \quad (9)$$

where i and k are indices to any ith and kth code elements. Then one can simply discard all the bad modulation values, and select a new code element from the remaining modulation values.

Optimality of the PPM waveform ensures that the addition of each new code element will not lead to any baud collisions with existing elements of the code, that is, the difference between the new code element and any of the previous code elements is distinct from all differences between the previous code elements. The baud collisions occur between pairs of code elements separated by the same number of PRIs. This means that with a list of N modulation values that are optimal, one can directly determine which modulation values, when placed at the (N+1)-th code element position, would cause a baud collision. More specifically, one can explicitly compute all of the bad modulation values, $j_{bad}$, for the (N+1)-th code element, via Equation (9) above.

However, in order for the code to be repeatable as well as optimal, additional constraints are introduced. When the base code is concatenated to copies of itself, there arises the possibility of baud collisions between elements of the base code and elements of the concatenated code, which will occur in the "future" once it is concatenated to itself. More specifically, baud collisions can now also occur between pairs of base code elements that are separated by the same number of PRIs modulo the total code length in a concatenated code. These collisions are referred to as "wrap-around" collisions, because they involve elements of the concatenated copy of the base code.

Cyclically optimal codes can be generated by updating the definition of the pool of bad modulation values to include the effect of wrap-around, in Equation (9) above.

Specifically, the wrap-around collisions in these cases can be avoided by adding two additional criteria for inclusion in the pool of bad modulation values. The effect is that the definition of the pool of bad modulation values now becomes the following Equation (10)

$$\left.\begin{array}{l}j_< = j_{N+1-(i-k)} + (j_i - j_k) \\ j_> = j_{N+1+(i-k)-N_{max}} - (j_i - j_k) \\ j_= = \dfrac{j_{N+1-(i-k)} + j_{N+1+(i-k)-N_{max}}}{2}\end{array}\right\} j_{bad} = j_< \cup j_> \cup j_=$$

where i<k<N, and $N_{max}$ is the length of the final code (i.e., $N \le N_{max}$).

Here, $j_<$ can be thought of as filtering out modulation values that would cause a baud collision between some pair of earlier code elements; $j_>$ filters out modulation values that would cause a collision between some pair of "later" code elements (i.e., code elements in the wrap-around region); and $j_=$ filters out modulation values that would lie equidistant between some previous code element, and a later code element, as described above.

Unlike the process of generating generally optimal codes, cyclically optimal code generation requires a definition of the final code length from the beginning. The longest possible code length for a given modulation pool size can be estimated by solving for the coupon collector's problem, which yields (the derivation is described in more detail below):

$$N_{max} \approx \sqrt{en_d(\ln n_d + \gamma)} \quad (11)$$

where $\gamma \approx 0.57721$ is the Euler-Mascheroni constant, and $n_d = 2j_{max}/\Delta j$ is the size of the modulation pool.

As a function of modulation pool size, the longest possible cyclically optimal code tends to be smaller than the longest possible generally optimal code by $\sim\sqrt{2}$. This is due to having roughly twice as many constraints on possible modulation pool size per iteration.

As an illustrative example, if the process generated the following set of modulation values, where $j_{max}/\Delta j=10$ and $N_{max}=13$:

j=[0 2 -3 6 5 -5 7 -4 7 -8 6 9 -8]

This code can then be added element-wise to any set of nominal PRI timings for which $$\frac{j_m}{PRI} < 0.25,$$

e.g. $T_m = m \times 50$ for $0 \le m <$ length(j):

T=[0 50 100 150 200 250 300 350 400 450 500 550 600]

Then the waveform pulse timing for the m-th pulse would be defined as $t_m = T_m + j_m$. The auto-correlation oft has maximum side-lobe height of 1, indicating that it is optimal. But, one can also use the fact that the waveform is cyclically optimal to construct a new waveform that is three times the length of our base-code. This new waveform would have transmit timings t', such that $t_m' = m \times 50 + j_{m \bmod N_{max}}$, for $0 \le m < 3N_{max}$. The auto-correlation of the resulting waveform has both peak and maximum side-lobes that are 3 times higher (bottom figure), for lags less than the maximum lag of the original code (in this case, 600). As a result, for targets with a round-trip light time less than the temporal extent of the base code, this extended code has an identical PMSLR.

Figure 3:
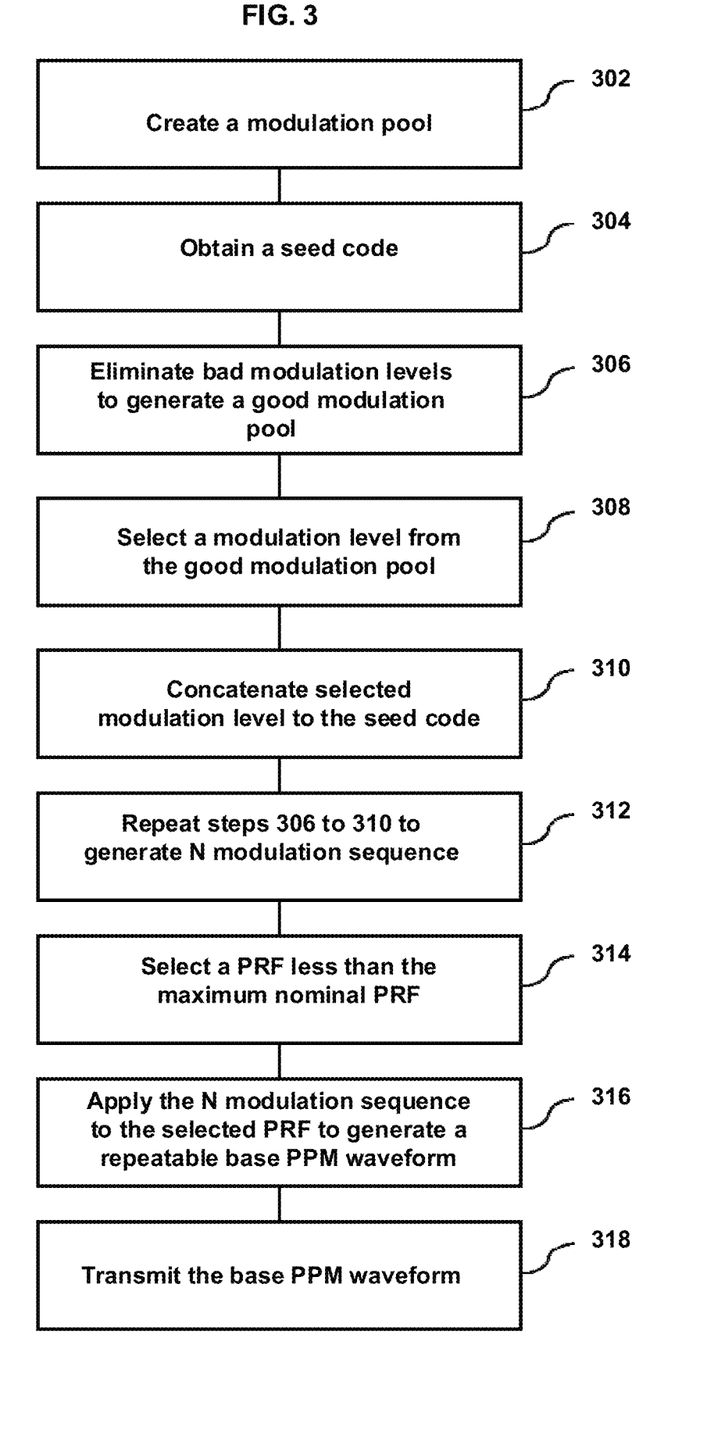
FIG. 3 is an exemplary process flow block diagram for generating PPM waveforms, according to some embodiments of the disclosed invention.

FIG. 3 is an exemplary process flow block diagram for generating repeatable PPM waveforms, according to some embodiments of the disclosed invention. A modulation pool is created in block 302, based on a maximum nominal pulse repetition frequency (PRF) and a specified final PPM code length of N. In some embodiments, the modulation pool, contains all possible modulation elements that can be generated by the hardware defining the given system. The size of this pool is determined by a chosen maximum nominal PRF. More specifically, the number of elements in the modulation pool is given by the ratio of the system's maximum possible modulation to the system's minimum possible modulation. The maximum possible modulation is often expressed as a fraction of the nominal PRI (equal to the reciprocal of the nominal PRF), where this fraction can never be greater than one quarter. In block 304, a seed code is obtained or initialized. The seed code may be a null code, or a pre-existing code In block 306, bad modulation levels are determined and eliminated from the modulation pool to generate a good modulation pool. The bad modulation levels are those modulation levels that when placed in the PPM code would cause a baud collision. Baud collisions occur in a code of length N if there exist two or more pairs of pulses with shared differences. However, in a repeatable code, when the code is concatenated to itself, baud collisions can also occur between pairs of code elements separated by the same number of PRIs, modulo the total code length, that is, between the elements of the base code and the elements of the concatenated code (second instance or subsequent instances of the base code in the concatenated code). However, as explained above, the wrap-around collisions in these cases can be avoided by adding two additional criteria for inclusion in the pool of bad modulation values.

Accordingly, in addition to discarding modulation levels that cause a baud collision between any pair of code elements, modulation levels that cause a baud collision between any pair of code elements of the base code in a wrap-around region and modulation levels that lie equidistant between code element of the base code and code elements in the wrap-around region are also discarded. In some embodiments, the bad modulation levels are determined according to Equation (10) below.

In other words, a repeatable PPM waveform is optimized under the assumption that whatever base code is generated, it is going to be repeatable, i.e., copied or concatenated (any number of times). Therefore, final repeatable codes are generated with the property that not only avoid baud collisions between the elements of the base code, but also that they avoid baud collisions between the elements of the base code and the elements of the first repeated (concatenated) copy of the base code.

A single modulation level is then selected from the good modulation, in block 308. In some embodiments, the new modulation level is selected according to a selection function that computes the best available next element, as described below. Longer codes can be generated by optimizing the form of the selection function. In block 310, the selected modulation level is concatenated to the seed code to generate the i-element modulation sequence, where i is an integer index.

In block 312, blocks 306 to 310 are repeated N times to generate an N element modulation sequence. Each iteration determines a list of bad modulation values for the (N+1)-th code element and discards them. The new code element is then determined by selecting one modulation value from the pool of good modulation values, $j_{good}$. Therefore, there is some flexibility as to how to choose one modulation value from that list. Other techniques for code generation do not have this flexibility, as $j_{good}$ can't be determined.

In block 314, a PRF less than the given maximum nominal PRF is selected. The N element modulation sequence is then applied to the selected PRF to generate a repeatable base PPM waveform, in block 316. The resulting process generates cyclically optimal codes with thousands of elements in seconds, while the conventional approaches may take many hours for the same task. The generated cyclically optimal codes have a maximum length that is determined by the size of the modulation pool, which in turn is determined by the hardware limitations. Moreover, the auto-correlation function of the resulting waveform has a larger peak to maximum sidelobe ratio (PMSLR) than was previously achievable in waveforms of the same length. In block 318, the generated repeatable base PPM waveform is transmitted, for example by a lidar system, toward a target to determine a range to the target. The return signal from the target can then be utilized to find the range to the target. This base code can be concatenated to itself any number of times, before or during the transmission.

The system and method of the disclosed invention is applicable to and therefore improves the following technologies: target detection and tracking, autonomous vehicles, mining, astronomy, robotics, spacecrafts, geology and soil sciences, agriculture (e.g., seed and fertilizer dispersions, sensing techniques, crop scouting), archaeology (e.g., planning of field campaigns, mapping features under forest canopy, and overview of broad, continuous features indistinguishable from the ground) and many others.

Optimizing the selection function is now described. As explained above, one step of process involves choosing a new modulation value to append to the PPM code, from the pool of good modulation values, $j_{good}$. $j_{good}$ is guaranteed to only contain modulation values that will avoid a baud collision. In other words, modulation values that cause a baud collision are eliminated, as bad modulation values. The choice of modulation value from $j_{good}$ is performed by a selection function, $f_{sel}(j_{good})$. One advantage of this process is the flexibility that is afforded by being able to tailor the selection function. The conventional approach to code generation does not know a priori which modulation values are "good" or "bad", and therefore can only select values at random until a non-collision is found. This process of random search is the source of the exponential slowdown experienced by current state-of-the-art algorithms, as the random search must be restarted every time a collision is detected. However, it is determined that optimization of the selection function can lead to generation of longer codes, with the same size modulation pool.

The nominal selection function is $f_{sel}(j_{good})$=randsample $(j_{good})$. The length of optimal codes generated with this selection function are generally comparable to those generated by the conventional approaches (provided the conventional approaches are afforded enough compute time to overcome the exponential slowdown). Another choice of selection function is referred to as MaxMinDist($j_{good}$), which chooses a new modulation value, $j_{new}$, from $j_{good}$, such that $j_{new}$ maximizes the minimum distance between its own position and that of modulation values that have been removed from the pool (if multiple members of $j_{good}$ meet this criterion, then one is chosen at random). In other words, $j_{new}$ is chosen to lie as far as possible from the bad modulation values in the total modulation pool.

Since the present process for waveform generation described above is iterative, an initial seed code (typically of zero length) is built up with optimal modulation levels, until the point where adding any modulation level would render the code non-cyclically optimal. It can be useful to have a priori knowledge of where that process can be expected to terminate. For example, defining system requirements (what size modulation pool is needed for a particular length code; defining expected runtime for codes that fill the pool of available modulation level; and/or measuring selection function performance and whether it out-perform a baseline performance. In some embodiments, the expected final code length, $N_{max}$ can be predicted by phrasing the question in the context of the coupon collector's problem.

The coupon collector's problem considers a pool which contains an infinite number of coupons, of which there are $n_c$ distinct groups. Each iteration, a collector randomly selects a coupon from the pool. Determining the expected number of iterations, $\bar{N}$, before the collector will have found at least one coupon from each of the $n_c$ groups is a classic combinatorics problem, and can be described as the product of $n_c$ and the $n_c$-th harmonic number:

$$\bar{N} = n_c \times \Sigma_{i=1}^{n_c} 1/i \approx n_c(\ln(n_c) + \gamma) \tag{12}$$

where $\gamma \approx 0.5772$ is the known Euler-Mascheroni constant.

The disclosed invention utilizes a process for adding a new modulation level at the (N+1)-th position of a PPM code by determining which modulation levels would cause a collision. Alternatively, one can say that at iteration N+1, N previous iterations have "collected" modulation level differences. Specifically, iteration number N calculates N new differences, and then adds them to previous modulation level to determine the colliding values (i.e., previously collected coupons). Therefore, iterations 1 through N will have collected a total of N(N+1)/2 modulation levels. As a result, the process may terminate, at iteration $N_{max}$, corresponding to the point at which all the modulation levels from the modulation pool of size $n_d$ have been collected, when $$N_{max}(N_{max}+1)/2 \approx n_d(\ln(n_d)+\gamma) \tag{13}$$

Or, equivalently:

$$N_{max} \approx \frac{-1 + \sqrt{1 + 8n_d(\ln(n_d) + \gamma)}}{2} \tag{14}$$

If one generally expects $N_{max} \gg 1$, then this can be further reduced to yield Equation (11) above:

$$N_{max} \approx \sqrt{2n_d(\ln(n_d)+\beta)} \tag{11}$$

However, sometimes, iterations of this process according to Equation (11) calculate bad modulation levels that lie outside the range of the modulation pool. For example, consider a modulation pool of size 21 (i.e., $j_{max}=10$, and $j=-10$ to 10), and suppose one constructs the initial code $j_1=-10$, $j_2=10$. Then, the third element's only bad modulation level would be $j_{bad}=10+(10-(-10))=30$, which is outside the modulation pool. In the context of coupon collecting problem, this would correspond to occasionally collecting "blank" coupons, that are not members of any of the $n_c$ distinct groups being collected.

The magnitude of this effect on $N_{max}$ can be empirically estimated, if one assumes that the effect acts as a scalar multiplier on the final code length, such that:

$$N_{max} \approx f_{ext} \times \sqrt{2n_d(\ln(n_d)+\gamma)} \tag{15}$$

where $f_{ext}$ is the factor by which code length is extended due to this effect.

As a general heuristic, one expects $1 < f_{ext} < 2$, because the effect will tend to enlarge the pool, but there will never be more than twice as many "blank coupons" as real ones. Referring to the above example, $j_{bad}$ can extend from −30 to +30, while the modulation pool size only extends from −10 to +10. In one case, to estimate $f_{ext}$, the above process was used to generate codes for modulation pool sizes between 100 and 20,000, and then fit Equation (14) to the resulting code lengths, with $f_{ext}$ as the single floating parameter. Therefore, one can generally predict maximum code length, $N_{max}$, as a function of modulation pool size, $n_d$, via:

$$N_{max} \approx f_{ext} \times \sqrt{2n_d(\ln(n_d)+\gamma)} \tag{16}$$

where $f_{ext} \approx 1.625 \approx \sqrt{e}$

As mentioned above, when the additional constraints are employed to generate a cyclically optimal code, this estimate need to be reduced by a factor of $\sqrt{2}$.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended drawings and claims.

What is claimed is:

1. A method for generating repeatable Pulse Position Modulated (PPM) waveforms in a lidar, the method comprising:
    a) creating a modulation pool, based on a maximum nominal pulse repetition frequency (PRF) and a specified final PPM code length of N, wherein N is an integer greater than 1;
    b) obtaining a seed code;
    c) eliminating bad modulation levels from the modulation pool to generate a good modulation pool;
    d) selecting a modulation level from the good modulation pool;
    e) concatenating the selected modulation level to the seed code to generate an i-element modulation sequence, wherein i is an integer index greater than 1;
    f) repeating steps c to e N times to generate an N-element modulation sequence;
    g) selecting a PRF less than the maximum nominal PRF;
    h) generating a concatenated repeatable base PPM waveform by applying the N-element modulation sequence to the selected PRF; and
    i) transmitting the concatenated repeatable base PPM waveform by the lidar toward a target to determine a range to the target, wherein
    eliminating bad modulation levels comprises: discarding modulation levels that cause a baud collision between any pair of code elements in the base PPM waveform; discarding modulation levels that cause a baud collision between any pair of code elements in the base PPM waveform and a concatenated code formed by concatenating the base PPM waveform to itself; and discarding modulation levels that lie equidistant between the elements in the base PPM waveform, and code elements in the concatenated code.

2. The method of claim 1, further comprising concatenating the base PPM waveform to itself before or during transmission.

3. The method of claim 1, wherein the modulation level is selected using a selection function.

4. The method of claim 3, wherein the selection function selects a modulation level via random sampling of the good modulation pool.

5. The method of claim 3, wherein the selection function computes a best available next PPM code element.

6. The method of claim 3, wherein the selection function is optimized to generate longer PPM codes.

7. The method of claim 3, wherein the selection function chooses a new modulation level from the good modulation pool such that the new modulation level maximizes the minimum distance between its own position and position of modulation levels that have been removed from the modulation pool.

8. The method of claim 1, further comprising receiving a waveform reflected from the target to determine the range to the target.

9. The method of claim 1, wherein the bad modulation levels are determined from the following formula:

$$j_< = j_{N+1-(i-k)} + (j_i - j_k)$$
$$j_> = j_{N+1+(i-k)-N_{max}} - (j_i - j_k)$$
$$j_= = \frac{j_{N+1-(i-k)} + j_{N+1+(i-k)-N_{max}}}{2}$$
$$\left.\begin{array}{l}\end{array}\right\} j_{bad} = j_< \cup j_> \cup j_=$$

10. A lidar for generating repeatable Pulse Position Modulated (PPM) waveforms to determine a range to a target comprising:
a processor for a) creating a modulation pool, based on a maximum nominal pulse repetition frequency (PRF) and a specified final PPM code length of N, wherein N is an integer greater than 1; b) obtaining a seed code; c) eliminating bad modulation levels from the modulation pool to generate a good modulation pool; d) selecting a modulation level from the good modulation pool; e) concatenating the selected modulation level to the seed code to generate an i-element modulation sequence, wherein i is an integer index greater than 1; f) repeating steps c to e N times to generate an N-element modulation sequence; g) selecting a PRF less than the maximum nominal PRF; h) generating a concatenated repeatable base PPM waveform by applying the N-element modulation sequence to the selected PRF, wherein
eliminating bad modulation levels comprises: discarding modulation levels that cause a baud collision between any pair of code elements in the base PPM waveform; discarding modulation levels that cause a baud collision between any pair of code elements in the base PPM waveform and a concatenated code formed by concatenating the base PPM waveform to itself; and discarding modulation levels that lie equidistant between the elements in the base PPM waveform, and code elements in the concatenated code;
a transmitter for transmitting the concatenated repeatable base PPM waveform toward the target; and
a receiver for receiving a waveform reflected from the target to determine the range to the target.

11. The lidar of claim 10, wherein the processor concatenates the base PPM waveform to itself before or during transmission.

12. The lidar of claim 10, wherein the processor selects the modulation level using a selection function.

13. The lidar of claim 12, wherein the selection function selects a modulation level via random sampling of the good modulation pool.

14. The lidar of claim 12 wherein the selection function computes a best available next PPM code element.

15. The lidar of claim 12, wherein the processor optimizes the selection function to generate longer PPM codes.

16. The lidar of claim 12, wherein the selection function chooses a new modulation level from the good modulation pool such that the new modulation level maximizes the minimum distance between its own position and position of modulation levels that have been removed from the modulation pool.

17. The lidar of claim 10, wherein the processor determines the bad modulation levels from the following formula:

$$j_< = j_{N+1-(i-k)} + (j_i - j_k)$$
$$j_> = j_{N+1+(i-k)-N_{max}} - (j_i - j_k)$$
$$j_= = \frac{j_{N+1-(i-k)} + j_{N+1+(i-k)-N_{max}}}{2}$$
$$\left.\begin{array}{l}\end{array}\right\} j_{bad} = j_< \cup j_> \cup j_=$$

\* \* \* \* \*